Nov. 20, 1951     W. R. WINSLOW     2,575,647
AIRCRAFT LANDING GEAR
Filed Jan. 13, 1948     4 Sheets-Sheet 1
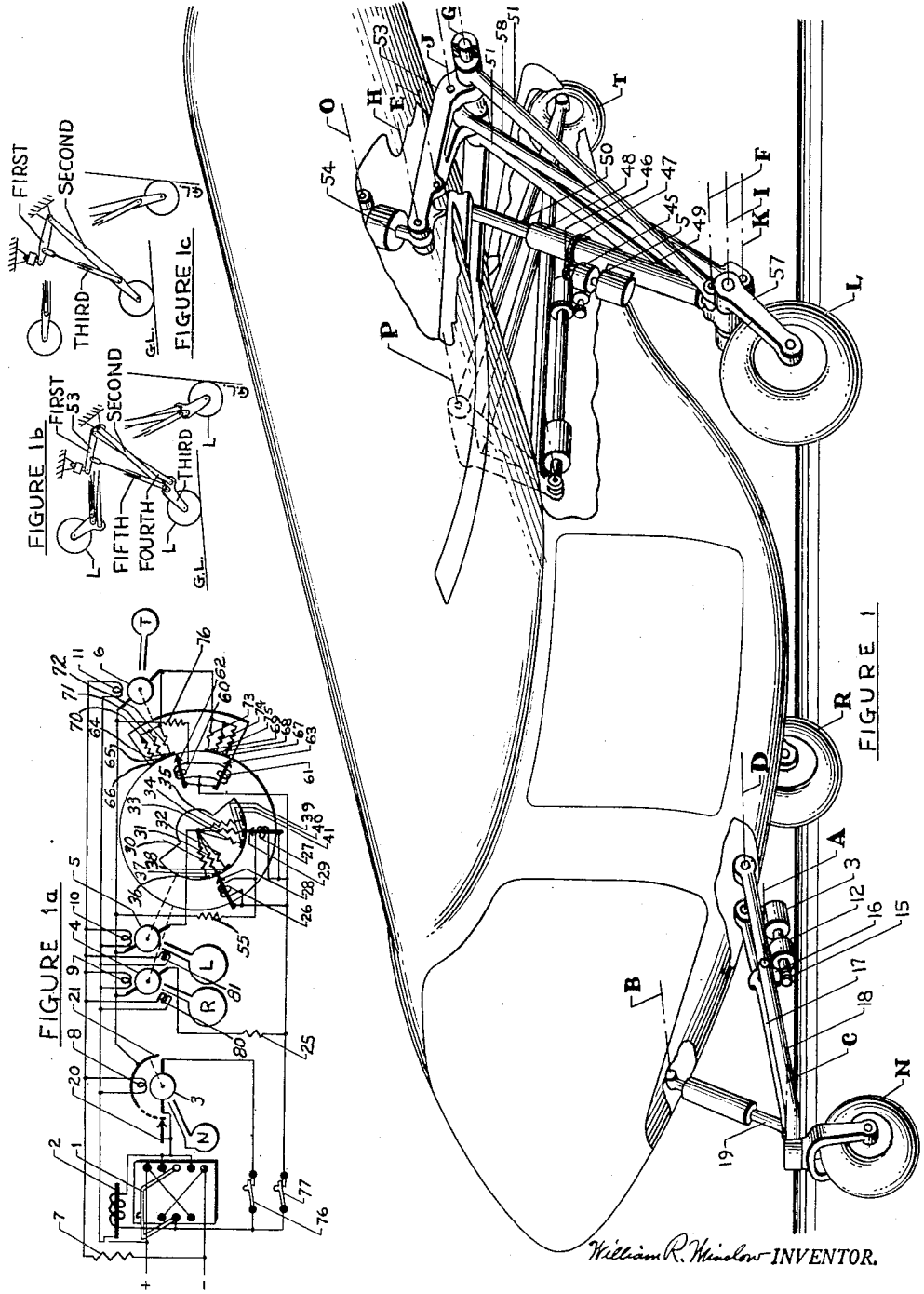
William R. Winslow — INVENTOR.
BY Philip S. McLean, atty.

Nov. 20, 1951 W. R. WINSLOW 2,575,647
AIRCRAFT LANDING GEAR
Filed Jan. 13, 1948 4 Sheets-Sheet 2
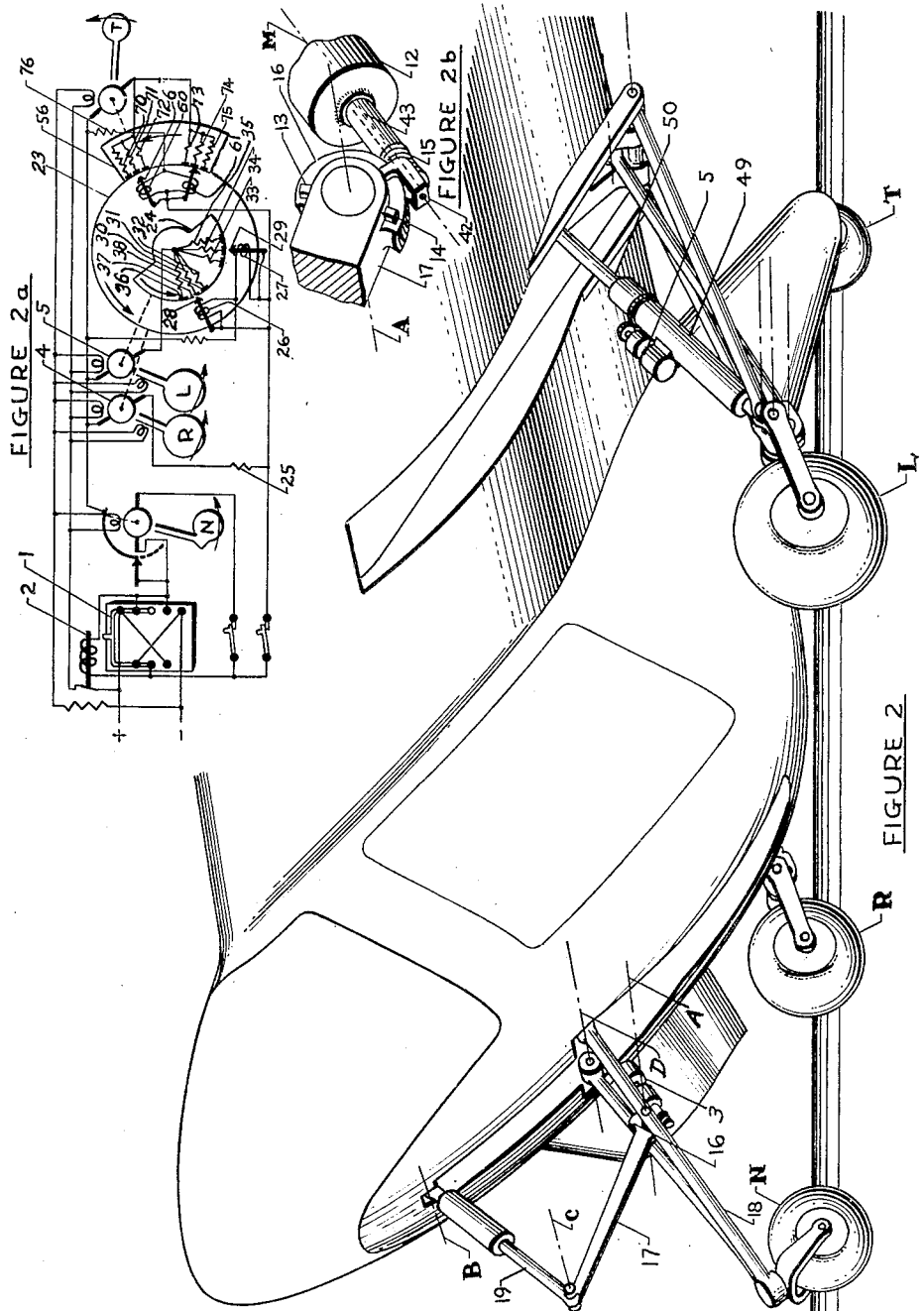
William R. Winslow INVENTOR.
BY Philip S. McCrew
Atty.

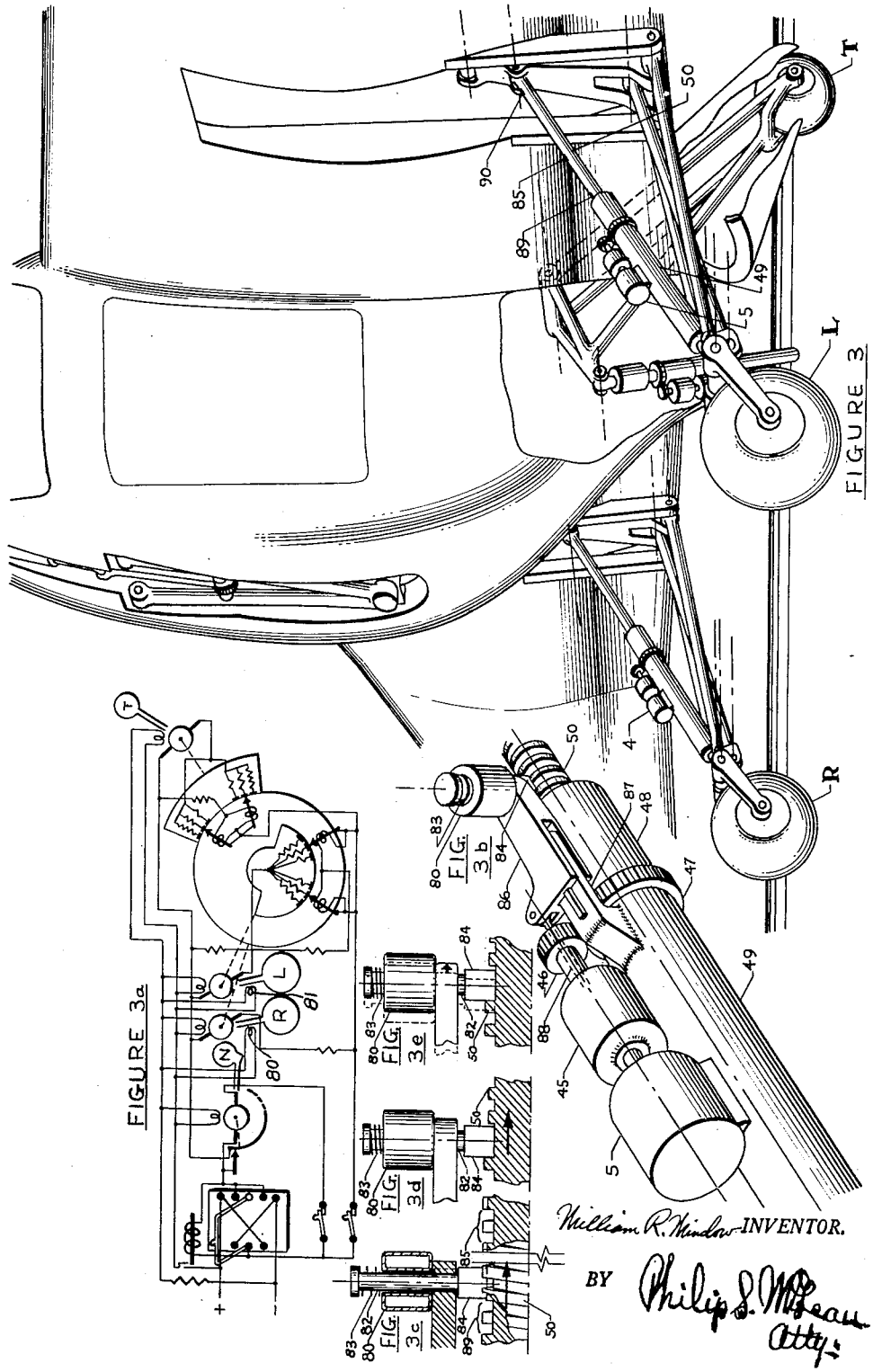

Nov. 20, 1951 — W. R. WINSLOW — 2,575,647
AIRCRAFT LANDING GEAR
Filed Jan. 13, 1948 — 4 Sheets-Sheet 4
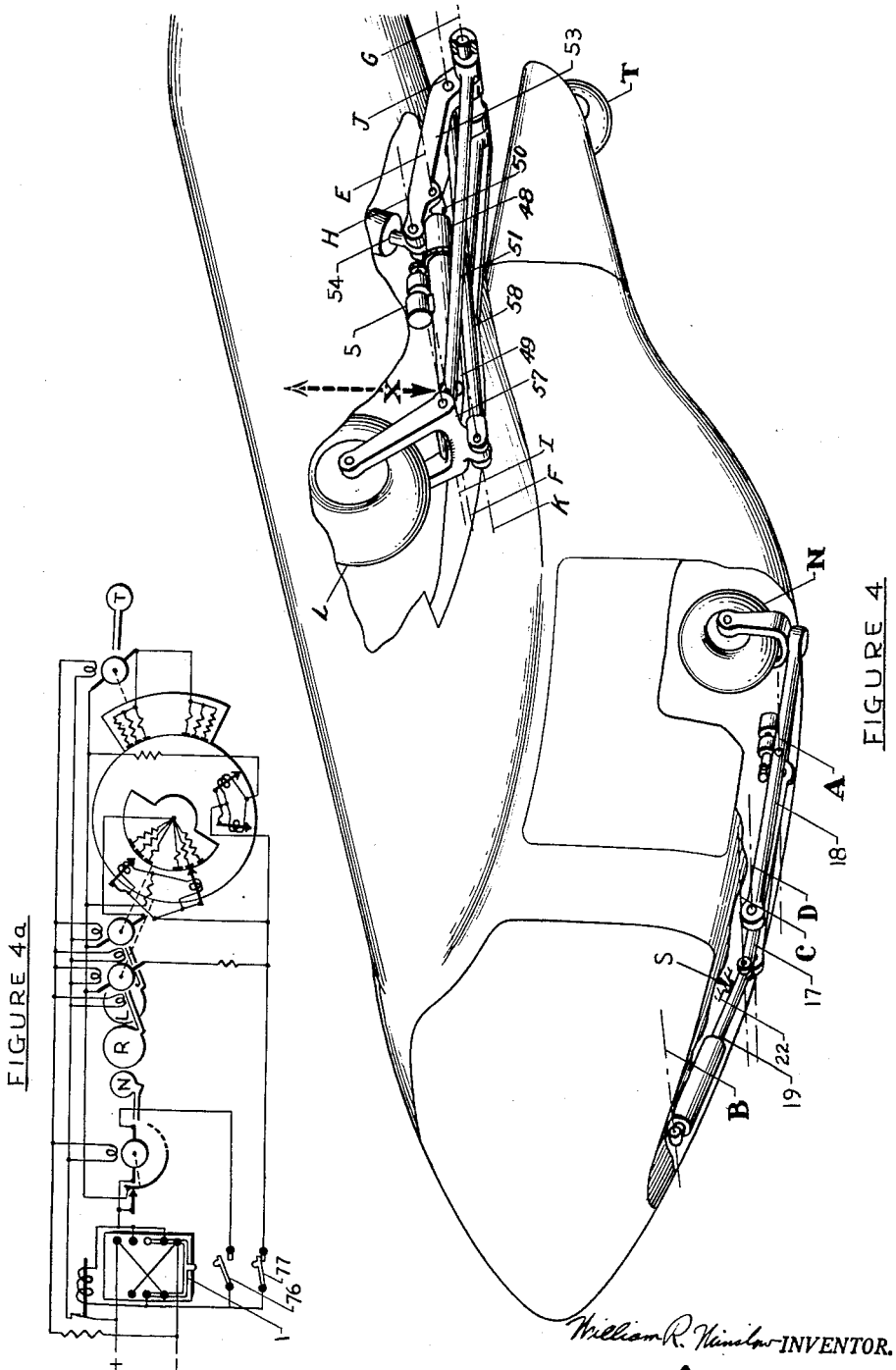
William R. Winslow INVENTOR.

Patented Nov. 20, 1951

2,575,647

UNITED STATES PATENT OFFICE 2,575,647

AIRCRAFT LANDING GEAR

William R. Winslow, North Tonawanda, N. Y.

Application January 13, 1948, Serial No. 1,952

3 Claims. (Cl. 244—102)

The invention herein described relates to landing gear for aircraft.

One of the objects of the invention is the providing of means for supporting an aircraft on the conventional tricycle arrangement of landing wheels in the normal attitude for horizontal take-off or landing.

The invention has as a further object the provision of means for supporting the aircraft on a stable arrangement of three landing gear wheels in an attitude for a vertical take-off or landing.

The invention has as a further object the provision of a rearrangement of four landing gear wheels to change the aircraft attitude to either the horizontal or the vertical attitude for take-off or landing.

The invention has as a further object the provision of mechanical means for an automatically coordinated rearrangement of four landing wheels to change the aircraft attitude to either the horizontal or the vertical attitude for take-off or landing.

The invenion has as a further object the advantageous disposal of a rear landing gear wheel wherein three of the four landing gear wheels are disposed in the conventional tricycle manner and the fourth disposed in the usual location of a tail wheel or tail skid.

The invention has as a further object the arrangement of struts and a method and means of varying said arrangement of struts on either of the two main landing gear units to relocate the wheels of said units relative to the aircraft and to the remaining two wheels to positions appropriate for the two respective landing attitudes of the aircraft, horizontal and vertical, and to locations appropriate for their stowage in flight within the body form of the aircraft, providing in the arrangements of the struts for either of the two wheel positions for landing the characteristically rigid form of a triangle in the load-carrying structural members of these units, and further providing in the retracted wheel positions a collapsed arrangement of the struts affording convenient and compact stowage.

In the drawings accompanying and forming part of this disclosure,

Fig. 1 is a broken perspective pictorial representation of the landing gear in the configuration for horizontal take-off or landing;

Fig. 1a is a diagram of the electrical system showing schematically the basic units of the landing gear and the inter-unit coordinating devices in positions corresponding to the landing gear configuration shown in Fig. 1;

Fig. 1b is a schematic representation of the primary mechanical parts of the right or left main landing gear units;

Fig. 1c is a schematic representation of the primary mechanical parts of a main landing gear unit illustrative of a basic triangular design;

Fig. 2 is a broken perspective pictorial representation of the landing gear in a configuration during a transition of the aircraft between the horizontal and vertical ground attitudes;

Fig. 2a is a diagram of the electrical system showing schematically the basic units of the landing gear and the inter-unit coordinating devices, and showing the positions and motions of these devices corresponding to the transitional configuration shown in Fig. 2;

Fig. 2b is an enlarged pictorial representation of arm 17, gear 16 and the device for actuating clutch 12;

Fig. 3 is a fragmentary perspective pictorial representation of the landing gear in the configuration for vertical take-off or landing;

Fig. 3a is a diagram of the electrical system showing schematically the basic units of the landing gear and the inter-unit coordinating devices in positions corresponding to the configuration of Fig. 3;

Fig. 3b is an enlarged perspective view of screw-jack strut 49 and the device for actuating clutch 45;

Figs. 3c, 3d and 3e are illustrations of the action of the clutch-actuating device represented in Fig. 3b;

Fig. 4 is a broken perspective pictorial representation of the landing gear in a retracted configuration;

Fig. 4a is a diagram of the electrical system showing schematically the basic units of the landing gear and the inter-unit coordinating devices in positions corresponding to the configuration of Fig. 4.

In this invention the landing gear mechanism serves, according to the pilot's discretion and control, either to retract the landing gear into the body form of the aircraft or to rotate the aircraft on the ground to the attitudes of either a horizontal or vertical take-off. These two attitudes are illustrated, respectively, in Figs. 1 and 3.

The means for manual control by the pilot consists of an electrical switch, the motion of which in one direction causes a clockwise rotation of the landing gears and in the opposite direction a counter-clockwise rotation.

As an example it may be supposed that switch

1, Figs. 1 and 1a, is moved to the position shown in Fig. 2a. Direct current through switch 1 actuates electromagnet 2 which closes the circuit to the field windings of motors 3, 4, 5 and 6. Resistance 7 serves to reduce the voltage to a value suitable for the field windings 8, 9, 10 and 11.

Current through switch 1 also flows to the armature of motor 3 and causes motor 3, through clutch 12, Fig. 1, to rotate worm 15 and gear 16. (See also Fig. 2b.) Arm 17 rotates about axis A with respect to beam 18. Shock strut 19 fastened to the aircraft at axis B and to arm 17 at axis C reacts against the rotation of arm 17 and causes beam 18 to rotate about axis D with respect to the aircraft.

The nose landing wheel N thereby rotates downward and to the rear, tilting the aircraft nose-upward until its center of gravity is to the rear of the main landing wheels R and L and tail wheel T is at the level of the ground.

During this action, motors 4, 5 and 6 are caused to remain idle by a position switch at the nose landing gear. The electrical circuit between brush 20 and arc 21 is discontinued by a non-conductor portion of arc 21, indicated in Fig. 1a by the heavy broken line portion of the arc. When the nose wheel N reaches the position shown in Figs. 2 and 2a, electrical contact is made between brush 20 and arc 21, completing the electrical circuit to the armatures of motors 4 and 5.

Contained in the circuit to motor 4 is resistance 25, Fig. 1a. Contained in the circuit to motor 5 are two sets of multiple resistances—one set composed of three resistances 30, 31 and 32, and the other set composed of three resistances 33, 34 and 35. Two solenoids 26 and 27 mounted on disc 24 are wound oppositely so that the direct current supplied to them will cause their cores to be forced in opposite directions relative to the common center of discs 23, 24 and 56. Attached to these two cores are brushes 28 and 29. Resistance 55 serves to reduce the current from the armature circuit to a current suitable for the solenoids. With current in the solenoids of the polarity produced by the position of switch 1 in Fig. 2a, solenoid 27 causes brush 29 to be removed from commutator segments 39, 40 and 41 and also holds brush 28 against commutator 37. The armature circuit to motor 5 is thereby completed. This armature circuit containing resistance 31 is similar to the armature circuit to motor 4 containing resistance 25. The right and left main landing gear units R and L are identical, and the following description of the actions of the parts of the left landing gear applies as well to the right landing gear.

Motor 5, through clutch 45, Fig. 3b, rotates gear 46 which drives gear 47. Gear 47 and the nut 48 to which it is attached rotate on strut 49 and drive screw 50 outward from this hollow strut.

The distance between axes E and F, Fig. 1, is thereby lengthened. The forked strut 51 to which strut 49 is attached at axis F, rotates to the rear about axis G. Axis G is fixed to the aircraft. Axis E is fixed to beam 53 which is in turn fixed to the aircraft structure at axis G and to shock strut 54 at axis H. Shock strut 54 is fixed to the aircraft structure at axis O. Structure 57 is attached at axis I to structure 51. Strut 58 is attached to beam 53 at axis J and to structure 57 at axis K.

As structure 51 rotates to the rear about axis G, strut 58 rotates structure 57 counter-clockwise as viewed from the left about structure 51 at axis I.

Discs 23 and 24, Fig. 2a, are connected, respectively, to the right and left landing gear units at G so as to duplicate on the discs the motion of structure 51 relative to beam 53, or connected to some other suitable part having a rotation representative of the transitional movement of the main landing gear unit throughout the positions illustrated in Figs. 1 to 4.

The right and left main landing gear wheels R and L are caused to move downward and to the rear with respect to the aircraft at approximately the same rate. However, it is presumed that due to differences in friction, loading, etc., one landing gear wheel may be caused to move faster than the other.

The transitional movement of the two landing gear units R and L are coordinated with each other as explained in the following.

It is assumed that landing gear unit R and its connected disc 23 rotate faster than landing gear L and its connected disc 24. This causes brush 28 which is mounted on disc 23 to be displaced from commutator 37 mounted on disc 24 and to contact commutator 38. The armature circuit to motor 5 now includes resistance 32 in place of resistance 31. Resistance 32 in the circuit to motor 5 is of a less value than the corresponding resistance 25 to motor 4. Motor 5 gains speed and causes landing gear unit L and disc 24 to overtake landing gear unit R and disc 23. Overspeeding of the landing gear unit R causes a suitable realignment of the two landing gear units R and L by replacement of the larger resistance 30 in the armature circuit of motor 5.

A rotation of the landing gear units R and L in the opposite direction causes solenoid 27 to close the electrical circuit with one of the three resistances 33, 34 and 35, and causes solenoid 26 to cut out the circuit through one of the three resistances 30, 31 and 32. This coordinating action between right landing gear unit R and left landing gear unit L operates in either direction.

While the main landing gear wheels R and L rotate downward and to the rear with respect to the aircraft, the tail landing gear wheel T rotates upward and forward about axis P with respect to the aircraft.

These motions of the main landing gear units R and L and the tail landing gear unit T are initiated at approximately the same time. Landing gear unit T is coordinated with landing gear unit R at discs 23 and 56. Solenoids 60 and 61, resistance 76, brushes 62 and 63, commutators 64 to 69 and resistances 70 to 75 function in the manner described above to coordinate the tail landing gear unit with the main landing gear units.

Continuing with the illustrative example, the nose landing gear unit reaches its retracted position as shown in Figs. 3 and 4. The reactionary force S exerted on arm 17 by stop 22, Fig. 4, further rotates the landing gear about axis D and holds it firmly in its retracted position. As long as switch 1 is held in the closed position shown in Fig. 2a, motor 3 continues to run. However, due to the action of clutch 12, the retracting operation is discontinued as the retracted position is reached. Lug 13 on gear 16, Fig. 2b, forces fork 42 in the direction along axis M. Connected to fork 42 is rod 43. Rod 43 actuates a disengaging action in clutch 12 which disengages worm 15 from the rotation of motor 3 which would move the landing gear further in the retracted direction. The clutch, however, remains engaged to rotation in the opposite direction until lug 14 moves fork 42 and rod 43 and disengages motor 3 from the motion of the retraction mechanism which would cause the landing gear to exceed the fully extended position shown in Fig. 1. Clutch 12 is disclosed in co-pending application Serial No. 782,090, filed October 25, 1947, now Patent No. 2,552,359 of May 8, 1951.

With the nose landing gear unit N in the retracted position, motor 3 runs freely while landing gear units R, L and T carry the aircraft to a vertical attitude. As these three landing gear units reach their respective positions for the vertical aircraft attitude as shown in Fig. 3, devices at each of the three landing gear units R, L and T stop their respective movements by disengaging their motors at their three respective clutches. The disengaging device for either of the two main landing gear units R and L is shown in Figs. 3b, 3c, 3d and 3e.

When switch 1 is closed in either of the two positions shown in Figs. 2a and 4a, direct current from the field circuits of motors 4 and 5 activates respective solenoids 80 and 81. As shown in Fig. 3c, the core 82 of solenoid 80 compresses spring 83 and forces block 84 downward against screw 50. As the main landing gear R reaches its rearward limiting position, the notch 89 in the thread of screw 50 passes under block 84. The pressure exerted by solenoid 80 forces block 84 into notch 89. Screw 50 continues to move, carrying with it block 84, solenoid 80, arm 86 and rod 88. Arm 86 slides along track 87. Rod 88 disengages clutch 45 and discontinues the transmission of motion between motor 5 and gear 46. When switch 1 is opened, spring 83 lifts block 84 in notch 89. However, the travel of block 84 is not sufficient to enable it to reach the top of the threads on screw 50, and the block therefore does not permit a spring tension in clutch 45 to move arm 86, etc., to the original position shown by the broken line in Fig. 3e and re-engage the clutch to rotation of motor 5 which would cause screw 50 to exceed its extended limit. The operation of the clutch, however, is such that it is still engaged to transmit a rotation of motor 5 in the direction which would not cause the screw to exceed its extended limit. A similar notch 90, Fig. 3, is provided at another part of screw 50 to prevent it from exceeding its limit at the retracted position of the landing gear, as shown in Fig. 4.

A third notch in the threads of screw 50, designated notch 85, located along the groove running between notches 89 and 90, Fig. 3, causes the motion of the landing gear to stop at any time the nut and screw reach the relative position for horizontal landing, such as shown in Fig. 1. The motion is stopped until switch 1 is opened and again closed. The purpose of this is to cause the two main landing gears to stop automatically at the respective positions for a horizontal landing.

It will be noted that when screw 50, after being stopped by the action of the block, is again started in the direction opposite to the direction in which it was moving when stopped, moves a short distance and is again stopped by the action of the block in the same notch. Switch 1 must then be opened and closed in order to continue the motion of the screw. This double-action characteristic of the landing gear control operation may be retained as a safety feature to prevent the landing gear from being moved by a single accidental closing of switch 1 in one of the directions of operation, or may be eliminated by the incorporation of a trip-latch device at the notches in screw 50.

It will be noted that this automatic stop action accomplished by the notches and groove in screw 50 may be satisfactorily attained by the incorporation of a part extraneous to screw 50 but having a similar construction and function.

With the landing gear configuration for a vertical take-off or landing, the landing gear may be retracted as follows: (See Figs. 4 and 4a.)

Since the closing of switch 1 in the direction which will cause landing gear units R, L and T to rotate clockwise into their retracted positions will also cause landing gear unit N to rotate clockwise out of its retracted position, switch 76 is opened to break the circuit to motor 3.

Switches 76 and 77 might advantageously be incorporated in the same lever that operates switch 1. For example, a twist of the handle to switch 1 in one direction would open switch 76 and in the opposite direction open switch 77; or, for example, two push-buttons connected, respectively, to switches 76 and 77 on the handle to switch 1 might be made to accomplish the same purpose.

With switches 1 and 76 operated as indicated in Fig. 4a, landing gear units R, L and T rotate about their respective axes from the positions shown in Fig. 3 to the positions shown in Fig. 4.

It is to be noted that the main landing gear units R and L in their retracted positions take on a compact form and provide ample room for the structural member of the wing as indicated in Fig. 4 by the distance X.

With an aim to reduce the construction of the main landing gear unit L (or R) to a minimum of basic parts, a schematic representation of this unit is illustrated in Fig. 1b. With a further aim to simplify consideration, the five primary members of this unit are designated and indicated in Fig. 1b as the first, second, third, fourth and fifth members, the ground level being indicated by the line G. L.

It is to be understood that the main landing gear unit L (or R) may be further simplified to a basic triangle having one side variable in length without altering the objects of the invention. Such a simplified unit is illustrated in Fig. 1c. The three primary members of this simplified unit are designated and indicated in the figure as the first, second and third members.

In this further simplification of the main landing gear unit, the landing wheel moves a lesser distance toward a retracted location within the wing or other structure of the aircraft for a corresponding collapsed arrangement of the legs of the basic triangle than does the landing wheel of the unit shown in Fig. 1b. For this reason the further simplified unit does not accomplish as convenient and as compact a form for stowage in flight. Also, the further simplified unit moves the landing gear wheel a lesser distance toward its location necessary for a vertical landing for a corresponding arrangement of the legs of the basic triangle than does the mechanism of the unit shown in Fig. 1b.

What is claimed is:

1. In an aircraft capable of landing in either a horizontal or vertical attitude, four landing gear units equipped with landing wheels and arranged the first and second in side-by-side relation and the third and fourth forward and rearward of the first two, the first and second units being mounted on the aircraft immediately rearward of the aircraft center of gravity and extending downward from its underside and being in effect composed primarily of five structural members, the first at one point pivotally attached directly to the structure of the aircraft and at another point pivotally attached through a shock absorbing device to the structure of the aircraft, the second pivotally attached to the first at or near the point at which the first is pivotaly attached directly to the structure of the aircraft, the third carrying a landing wheel and being pivotally attached to the second, the fourth at one end pivotally attached to the third and at the other end pivotally attached to the first, and the fifth pivotally attached to the second at or near the point of pivotal attachment of the second and third, said fifth member being possessed of the ability to be lengthened or shortened to change the shape of the basic triangle formed by the first, second and fifth members and thereby to effect movement of the location of the landing wheel with respect to the aircraft, and to so effect movement of the wheel to any one of the three locations suitable, respectively for (1) a horizontal take-off or landing, (2) a vertical take-off or landing and (3) stowage in flight within the streamlined shape of the aircraft; the third landing gear unit being mounted on the aircraft ahead of its center of gravity and extending downward from its underside and being in effect composed primarily of three structural members, the first carrying a landing wheel and being pivotally attached at one end to the structure of the aircraft, the second pivotally attached to the first at a point along its length, and the third pivotally attached at one end to the structure of the aircraft and at the other end to the second, said third member being possessed of the characteristic action of a shock struct, said three members being possessed of the ability to be moved about their respective pivotal attachments by a regulated relative angular movement between said first and second members such that the landing wheel may be rotated, under control, about the pivotal attachment of said first member and the aircraft, and in so rotating effect a rotation of the aircraft toward the attitude for a vertical take-off or landing, and in further rotating cause said third landing gear unit to effect a retracted location within the streamlined shape of the aircraft; and the fourth landing gear unit being mounted on the aircraft rearward of its center of gravity and extending to the rear in a trailing fashion and being in effect composed primarily of a structure carrying a landing weel and being pivotally attached at one point to the structure of the aircraft and at another point through a shock absorbing device to a structure which is able to move, under control, with respect to the aircraft and thereby to rotate said fourth unit about its first mentioned pivotal attachment and to effect a rotation of the aircraft to the attiude suitable for a vertical take-off or landing providing further that all movements described herein are reversible.

2. In an aircraft capable of landing in either a horizontal or vertical attitude, four landing gear units equipped with landing wheels and arranged the first and second in side-by-side relation and the third and fourth forward and rearward of the first two, the first and second units being mounted on the aircraft immediately rearward of the aircraft center of gravity and extending downward from its underside and being in effect composed primarily of three structural members the first at one point pivotally attached directly to the structure of the aircraft and at another point through a shock absorbing device to the structure of the aircraft, the second carrying a landing wheel and being pivotally attached to the first at or near the point of direct pivotal attachment of the first to the structure of the aircraft, and the third pivotally attached at one end to the second and at the other end to the first and being possessed of the ability to be lengthened or shortened to change the triangular shape of the three members and the location of the wheel with respect to the aircraft, and to effect movement of the wheel to any one of the three locations suitable, respectively, for (1) a horizontal take-off or landing, (2) a vertical take-off or landing and (3) stowage in flight within the streamlined shape of the aircraft; the third landing gear unit being mounted on the aircraft ahead of its center of gravity and extending downward from its underside and being in effect composed primarily of three structural members, the first carrying a landing wheel and being pivotally attached at one end to the structure of the aircraft, the second pivotally attached to the first at a point along its length, and the third pivotally attached at one end to the structure of the aircraft and at the other end to the second, said third member being possessed of the characteristic action of a shock strut, said three members being possessed of the ability to be moved about their respective pivotal attachments by a regulated relative angular movement between said first and second members such that the landing wheel may be rotated, under control, about the pivotal attachment of said first member and the aircraft, and in so rotating effect a rotation of the aircraft toward the attitude for a vertical take-off or landing, and in further rotating cause said third landing gear unit to effect a retracted location within the streamlined shape of the aircraft; and the fourth landing gear unit being mounted on the aircraft rearward of its center of gravity and extending to the rear in a trailing fashion and being in effect composed primarily of a structure carrying a landing wheel and being pivotally attached at one point to the structure of the aircraft and at another point through a shock absorbing device to a structure which is able to move, under control, with respect to the aircraft and thereby to rotate said fourth unit about its first mentioned pivotal attachment and to effect a rotation of the aircraft to the attitude suitable for a vertical take-off or landing, all said movements described being reversible.

3. In an aircraft, a landing gear unit extending downward from its underside and being in effect composed primarily of five structural members, the first at one point pivotally attached directly to the structure of the aircraft and at another point pivotally attached through a shock absorbing device to the structure of the aircraft, the second pivotally attached to the first at or near the point at which the first is pivotally attached to the structure of the aircraft, the third carrying a landing wheel and being pivotally attached to the second, the fourth at one end pivotally attached to the third and at the other end pivotally attached to the first, and the fifth pivotally attached to the second at or near the point of pivotal attachment of the second and third, said fifth member being possessed of the ability to be lengthened or shortened to change the shape of the basic triangle formed by the first, second and fifth members and thereby to effect movement of the location of the landing wheel with respect to the aircraft, and to so effect movement of the wheel to any one of the three locations suitable, respectively, for (1) a horizontal take-off or landing, (2) a vertical take-off or landing and (3) stowage in flight within the streamlined shape of the aircraft, the unit in said third location having a compact form affording room for maximum depth of spars or bulkheads and thus requiring less displacement of stringers and other load-carrying structures.

WILLIAM R. WINSLOW.

REFERENCES CITED

The following references are of record in the file of this patent:

UNITED STATES PATENTS

| Number | Name | Date |
|---|---|---|
| 1,310,716 | Salmson | July 22, 1919 |
| 1,521,824 | Merrill | Jan. 6, 1925 |
| 1,544,032 | Potez | June 30, 1925 |
| 1,716,439 | Gray | June 11, 1929 |
| 2,049,066 | Kindelberger | July 28, 1936 |
| 2,117,786 | Blume | May 17, 1938 |
| 2,394,361 | Bruderlin | Feb. 5, 1946 |
| 2,448,064 | Wallace | Aug. 31, 1948 |
| 2,481,379 | Zimmerman | Sept. 6, 1949 |

FOREIGN PATENTS

| Number | Country | Date |
|---|---|---|
| 468,063 | Great Britain | June 23, 1937 |
| 272,327 | Germany | Mar. 28, 1914 |
| 704,202 | Germany | Mar. 26, 1941 |